(12) United States Patent
Akae et al.

(10) Patent No.: US 6,802,805 B2
(45) Date of Patent: Oct. 12, 2004

(54) METHOD FOR RECOMBINING SOIL

(76) Inventors: Yukoh Akae, 1-10-18, Maikosaka, Tarumi-ku, Kobe-shi, Hyogo-ken (JP); Kazuo Kote, 1969 Kawashima-cho, Asahi-ku, Yokohama-shi, Kanagawa-ken (JP)

( * ) Notice: Subject to any disclaimer, the term of this patent is extended or adjusted under 35 U.S.C. 154(b) by 0 days.

(21) Appl. No.: 10/385,350

(22) Filed: Mar. 11, 2003

(65) Prior Publication Data

US 2003/0176757 A1 Sep. 18, 2003

Related U.S. Application Data

(63) Continuation of application No. 09/737,164, filed on Dec. 14, 2000, now abandoned.

(51) Int. Cl.$^7$ ................................................. B09B 1/00
(52) U.S. Cl. .................. 588/249; 588/256; 405/128.75; 405/128.1; 405/263; 405/270
(58) Field of Search ................................ 588/249, 256; 405/128.75, 128.1, 128.7, 129.3, 263, 264, 270

(56) References Cited

U.S. PATENT DOCUMENTS 5,295,761 A * 3/1994 Heacock et al. ....... 405/128.75
5,304,704 A * 4/1994 Kammeraad ........... 405/128.75
5,986,161 A * 11/1999 Akae et al. .................. 588/256

* cited by examiner

Primary Examiner—John Kreck
(74) Attorney, Agent, or Firm—Irving Keschner

(57) ABSTRACT

A method for recombining and then solidifying groups of soil particles by utilizing changes in the status and properties of soil particles which comprises a combination (in an adhering state) between soil particles and groups polymers (humin) in an aqueous solution (solvent). By using specified solvents, the preliminary treatment of separating soil particles and polymers is initiated. Secondarily, each structure of groups of soil particles is observed microscopically as a metal complex, and the combining method is accomplished by utilizing substitution based on various reactions (i.e. SN, SE, and SEAr type reactions) along with electron transfer in a solvent made of specified solutes. The substitution includes the rock forming function through the substitution of the hydrogen atom within the hydroxyl group of clay minerals as molecular components and the dehydration and dissociation function resulted from the binding structure of oxygen molecule $O^{-2}$ and $Al^{+3}$ as components of aluminum oxide.

15 Claims, No Drawings

METHOD FOR RECOMBINING SOIL

CROSS REFERENCE TO RELATED APPLICATIONS

This Application is a Continuation in Part of application Ser. No. 09/737,164 filed Dec. 14, 2000, now abandoned. This Application incorporates by reference the entire specification of application Ser. No. 09/737,164.

BACKGROUND OF THE INVENTION

1. Field of Invention

The present invention relates to the recombination of soil (i.e. secondary bonding as defined in the field of colloid chemistry) to promote recombination through various substitution processes utilizing specific solutes and the unique properties of soil particles themselves such, as bonding power and rock-forming power.

2. Description of the Prior Art

Many types of soil have a high water content including sludge-like soil existing in the river-bed or at the river-mouth, sand and mud found in water hazards polluted soil from factories, humin rich-soil found at roadside, in slanted ground, or at road construction sites, mountain soil having a low humin content, soil in the area of deforestation (rich in silica content), etc.

According to conventional technologies, solidifying soil is done by using zeolite, bentonite, Portland cement, citric acid, and is a temporary solidification.

The conventional method of solidification is to improve (or modify) soil quality by using zeolite (bentonite) as usual and to solidify (or cluster) soil by utilizing its adsorptive and catalytic actions. In addition, a method for temporary solidification mixes alkaline soil with chlorides of inorganic ions (or metal ions). The soil cement construction method is used for modifying the quality of underground and ground soil and uses specific metal ions by forming coordination compounds (i.e. complex) with citric acid. Another method for a long-term stable solidification of soil is to decompose humin contained in soil. However, techniques are currently not available for sufficient decomposition of the humin component.

The conventional methods of solidification mentioned above only provide temporary solidification. Even the solidification method by mixing soil with cement may not result in sufficient solidification of hazardous substances contained in soil. For instance, the solidification with organic chelating agents (e.g. citric acid) may cause secondary environmental pollution resulting from the elution of heavy metal ions and substances due to the destruction of crystals by the irradiation of UV ray and visible light.

In addition, sulfur compounds exhausted from smokestacks and in exhaust gas will combine with atmospheric moisture to form acid rain which causes the destruction of molecular structure within cement. Namely, cement becomes one of the causes of secondary environmental pollution, despite the fact that cement was originally used as a solidifying agent.

If there is humin component contained in soil, regardless if it is polluted soil or general soil, it will not be solidified (because it contains sugar component) even though cement or bentonite is used as a solidifying agent.

U.S. Pat. No. 5,295,761 describes a method for remediating soils contaminated with hydrocarbons. The method includes the steps of: collecting the contaminated soil; reducing the collected soil to finely-divided particles; applying a controlled amount of consisting essentially of an aqueous solution of sodium silicate, ethylene glycol and sodium methyl silanolate as a spray onto the contaminated soil particles; and aerating the soil particles as the additive is being applied. As will become evident from studying the description in this specification, the process of U.S. Pat. No. 5,295,761 is completely different from the process of this invention. First the process of U.S. Pat. No. 5,295,761 is only intended to remediate soil contaminated with hydrocarbons. It does not treat metallic contamination.

Further, the process of U.S. Pat. No. 5,295,761 involves spraying while the instant invention involves mixing of aqueous solutions. Finally, the process of U.S. Pat. No. 5,295,761 utilizes entirely different chemicals.

Development of a method for permanently solidifying soil including detoxification, stabilization and recombination satisfies a long felt need in the field of soil remediation.

SUMMARY OF THE INVENTION

The present invention relates to the recombination of soil (or secondary bonding) based on the theory of substitution of metal complex as focused on various types of substitution in solvation shell.

When considering recombination (secondary bonding or rock forming) of soil in the present invention, the bonding function of various metal oxides ($MO$, $SiO_2$, $Al_2O_3$ where M is metal) is utilized in soil having a diameter less then 2 $\mu m$ for recombination and rock formation through substitution in a solvent solution at room temperature.

Conversely, if fine particles of various metal oxides having a bonding function can be recombined in a solvent solution, it is possible to form rocks from soil once conditions and environment for recombination are arranged. One of the major inhibitory factors that block recombination is humin (protein, carbohydrate), fatty acids (including glycerin), and organic phosphate that are contained in soil.

The present invention enables the inhibitory factor (or the decomposition of humin) to be eliminated and at the same time to solidify hazardous semi-metal and heavy metal compounds as well as halogenated compounds in a stable state, resulting in making these compounds incorporated into soil. In other words, recombination is made possible by incorporating hazardous organic metals as a component of the soil.

The recombination is a consequence of a series of actual processes including detoxifying and solidifying hazardous semi-metal and heavy-metal compounds in a stable state and incorporating them as the components of soil above. However, it is necessary to separate the procedure into two steps, the preliminary treatment and the technical treatment at the stage of recombination. Therefore, when recombining soil particles the whole process is completed in two separate steps; the removal of the inhibitory factor (e.g. humin) and the detoxification, stabilization, and solidification of hazardous semi-metal and heavy metal compounds and halogenated compounds.

At the second step of the recombination, the hazardous semi-metal and heavy metal compounds and halogenated compounds that underwent detoxification, stabilization and solidification, are in the recombination process when incorporated into the whole as a component of recombination by substituting ligands.

Properties such as non-permeability, permeability, strength tolerance, heat resistance, resilience, saltwater resistance, acid resistance and alkali resistance that are required for actual field soil are the criteria when modifying soil quality according to invention.

The present invention provides the initial treatment in order to prepare the conditions for recombining various components of soil (including a variety of heavy metal compounds, semi-metal compounds, halogenated compounds and other substances), and to isolate and decompose the molecules of humin component (protein, carbohydrate) and fatty acids (including long-chain glycerin) as well as the detoxification and stabilization of hazardous metals in the solvation shell with specified solutes. Through the hydration and solvation effects of such solutes, the humin component of soil as an inhibitory factor against the bonding of soil particles is isolated and decomposed, and at a microscopic level various components of soil particles form metal coordination compounds (or metal complex). The present invention relates to the solute effect and coordination theory, in other words, chemical and physical recombination (or secondary bonding) of soil by providing conditions for establishing electron transfer (outer and inner-sphere mechanisms) of metal coordination compounds.

The present invention also provides a method for manufacturing soil having new properties by modifying soil quality by adding specified additives to the pre-treated soil.

This invention is a further development of the inventors' prior invention which is disclosed in U.S. Pat. No. 5,986,161. U.S. Pat. No. 5,986,161 discloses a method for neutralizing/detoxifying and stably fixing/solidifying combinations of hazardous compounds. The method comprises the following steps:

adding sodium nitrite and sodium 1-naphthylamine-4-sulfonate to the combinations;

stirring the resultant mixture for about 5 minutes;

allowing the mixture to set for about 10 minutes;

adding either 2-naphthol-4-sulfonic acid or 2-naphthol-7 sulfonic acid, and calcium oxide to the mixture;

stirring the mixture;

allowing the mixture to set for about one hour;

adding graphite;

stirring for about one hour; and allowing the mixture to set for about one hour.

It will be seen from the description below that the process described in this specification is completely different from the invention described in U.S. Pat. No. 5,986,161. U.S. Pat. No. 5,989,161 does not teach removing inhibitors and specifically does not mention removing humin. Further U.S. Pat. No. 5,989,161 utilizes substantially different chemicals for its process.

An appreciation of the other aims and objectives of the present invention and an understanding of it may be achieved by referring to the following description of a preferred embodiment.

DETAILED DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications and embodiments within the scope thereof and additional fields in which the present invention would be of significant utility.

According to the teachings of the present invention, the recombination of soil combines the clustering of soil particles in a microscopic form (particle diameter less than 2 m) in a solvent under the conditions where van der Waals force, hydrophobic interaction, ionic bonding, etc. are effective. In other words, the size of soil particles appear to become larger (or proliferate) as a result of the combination of metal, metal ions, and metal complex ions at the atomic and molecular level.

For the purposes of the present invention, the soil is assumed to be a complex member consisting of various soil particles such as humin component, and organic hazardous metals. Therefore, the recombination of soil is explained in the following order (1) the specific requirements for the analysis and recombination of soil, (2) the factors inhibiting the binding between soil particles (including hazardous organic metals in polluted soil and general soil), (3) the recombination of soil particles, and (4) the method for manufacturing soil having specific properties. As to items (1) and (2), the recombination between soil particles and the isolation of carbohydrate are explained from the viewpoint of outer and inner-sphere mechanisms.

(1) Analysis of soil and the requirements for specific recombination of soil. Soil can contain minerals existing in nature on the earth's crust from the mineralogical point of view and soil having a property of fracturing into particles in a finer size from the chronological point of view.

Purposes: fracturing minerals (a variety of rock components) into finer particles and the verification of various metals and major components existing in soil; the requirement for further (next step) recombination; the state of finer particles and various species of structural components (including minerals, metals, and formation of coordinate compounds); the confirmation of the existence of essential components (silicate, aluminum oxide) and the possibility of naturally occurring (voluntary) recombination.

A. Minerals Existing on Earth Crust in Nature (1) The matter in a state of being fractured into finer particles as a result of the efflorescent (or weathering) of rock. In other words, as volcanic gas and atmospheric air made contact, acid rain is generated by the conversion from hydrogen sulfide (HS) to sulfuric acid (H to dissolve rock minerals and elute components out and the step cycles.

(2) Various volcanic rocks and major components of sedimentary rocks (silicate minerals that are major components and most abundant in nature)

General formula: $A_{1-x}B_{2-3}\cdot[(OH)_2X_4^{(4)}O_{10}]$, where $A = K, Na, Ca, Ba, NH_4, H_3O$;

$B = Al, F^{III}, Fe^{II}, Mg, Mn^{II}, Li, Zn, V^{III}, Cr^{III}, Ti$; and $X = Si, Al, Be, Fe^{III}, x = 0 \sim 1.5$ (3) Clay minerals resulting from weathering can be classified into crystal and non-crystal. Moreover, they can be classified based on the clay activities.

Crystals are planar crystal (montmolironite, permulite, mica family) and needle-like crystal (pulgorkite, sepiolite) (also, existing as non-crystal such as allophane and imogolite)

In addition, there is the method of classification based on the clay activities including inactive clay (major component of kaolin), regular clay (major component of iliton), active clay (organic colloid), and bentonite having an activity value equal to or greater than 5. Therefore, according to the general definition of clay properties:

(a) Indicating plasticity when mixed with an adequate amount of water;

(b) Fine particles having a diameter ranging 1~20 $\mu$m by the maximum;

(c) Soil that can solidify when overheating or drying after moistened. The soil/matter having these properties is called clay.
4. Humus soil (the substance of animals and plants decomposed by bacteria living in soil)
5. Biological rock (classification based on chemical components)
   (a) Silica sedimentary substance (diatomaceous earth)
   (b) Carbonate sedimentary substance (coral limestone, spindle worm limestone)
   (C) Ferrous sedimentary substance (bog iron ore)
   (d) Phosphate sedimentary substance (guano, etc.)
   (e) Carbonaceous sedimentary substance (coal)

These substances are metamorphic rocks having a property prone to fracture into finer particles as time goes.

Classified as the group of Werner type complex coordination compounds from the standpoint of crystal structure of soil particles 1. Amine complex: buddingtonite, formula: $NH_4[AlSi_3O_8] \cdot \frac{1}{2}H_2O$
   Aqua complex: zeolite, formula: $M_{2/n}O \cdot Al_2O_3 \cdot xSiO_2 \cdot yH_2O$
   Where M=Na; K, Ca, Ba; n is valence; x=2~10; and y=2~7
   Aniono complex: biogenio rock, limestone, crystoval stone, formula: $(CaCO_8NaO \cdot CaO \cdot Al_2O_3$
2. Non-Werner type complex: Carbonyl complex and other classification is known.
3. Clay minerals (minerals that can be fractured in finer particle up to 1 $\mu$m
   Crystalline clay—montomolironite: from composition formula can be approximated $[Na, Ca]_{1/3} [Al, Mg]_2 [(OH)_2 Si_4O_{10}] \cdot nH_2O$ with a trace amount of K, $Fe^{III}$, $Fe^{II}$, Mn, $Cr^{III}$, and the like.
   Non-crystalline clay—allopane: formula is $LSiO_2 \cdot mAl_2O_3 \cdot nH_2O$ (L:m=1:1~2:1) be decomposed with acid and alkali and absorbs cupric ion ($Cu^{II}$)

As mentioned above, a wide variety of rock components will recombine when certain conditions are met.

II. Inhibitory Factors of Soil (hazardous metals, including organic hazardous metals such as mercury, arsine, etc.) in polluted soil and general soil (in other words, the combining member having hydrocarbon groups, or humin components)

Humin exists as a bonded (combined) form of phosphoric acid ($H_3PO_4$) and phosphate ester (for example, hydrogen dialkyl ester $<(RO)_2PO_2H$, various hydrocarbon compounds from carbohydrate (sugars), and peptide and the like generated (or decomposed) from protein and the binding members (phosphate compounds) of and phosphoric group $((PO_4)^{-4}, (HPO_3)^{-3}, H_2PO^{-2}$, etc.) as well as other polymers in a form of alkyl amide and alkylimide.

These substances may be finer particles resulting from weathering of sedimentary rocks and those generated from the decomposition of substances of everyday living.

The property of humin are as follows: charged electrically neutral and viscous, and adhering extensively onto the planar surface of a substance (metal oxide or metal compound) and a cluster of most soil particles and having a 3D structure to adhere perpendicularly onto the surface.

These humin components exist (in a river bed or polluted soil) in a form of mud as located on the surface and in a variety of soil particles and crystals.

Wherever water content is excessive, the environment is favorable for anaerobic bacteria (in the presence of humin) to gather together.

Preliminary Treatment (specific and technical explanations)

Preliminary treatment decomposes and clusters the humin component (in a state of molecular colloid) as an inhibitory factor of bonding between particles as mentioned above.

A sample specimen from third-class river bed, with water content around 100–110% was tested.

The (Solute 1) solution (1 mol concentration) is added to the specimen by 30 vol % and stirred (the list of salutes and additives used in the present invention is set forth in Table I)

TABLE I

| (Solute 1) | Sodium nitrite ($NaNO_2$) |
|---|---|
| (Solute 2) | Sodium 1-naphthylamine-4-sulfonate ($C_{10}H_8NO_2SNa$) |
| (Solute 3) | 1- or 2-naphthol-4-sulfonic acid ($C_{10}H_8NO_4S$) |

(Solute4) Sodium silicate (ortho- and meta-types) ($Na_4SiO_4$, $Na_2Si_2O_5$, $Na_2Si_4O_9$) ($Na_2SiO_3$)
(Additive 5) Calcium oxide (CaO) and hydrated lime (Ca(OH)) (Additive 6) Graphite
(Additive 7) Powdered member of metamorphic rock (particle diameter ranging from 10 to 1000 $\mu$m powdered sand stone (particle diameter ranging from 1/16 to 1/4 mm), and powdered member of mica family rock.

(Effect I)

The purpose of Solute 1 is to make a whole solution contained in the mixture of the above-mentioned specimen as a solvent, and to generate internal salt by making salting in various amino acid molecules (contained in a colloidal body) (Effect I) (Making a solvent) $NaNO_2+nH_2O$ - - - $NaOH+H$—O—N—O aq

Formula (1)

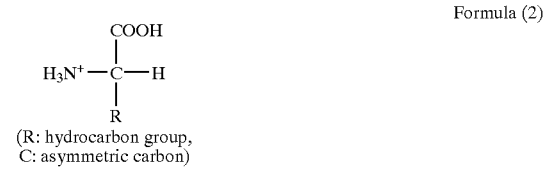

Formula (2)

(R: hydrocarbon group, C: asymmetric carbon)

SE type reaction takes place between the reactions represented by the above formula (1) and (2) and hydrogen (H bound with the asymmetric carbon in an amino acid molecule is eliminated and dispersed (decomposed), which is referred as a common ion effect. (Effect II)

Fatty acids existing in a state of molecular colloid are likely to be esterified explained by the following equations.

$NaNO_2+H_2O \rightarrow NaOH+HONO$     Formula (2A)

$2HONO+2H_2O \rightarrow N_2O_4+2H_3O$     Formula (2B)

Formula (2C)

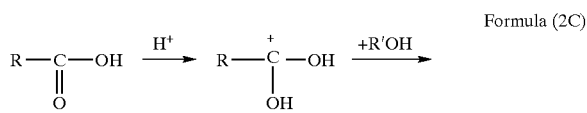

-continued

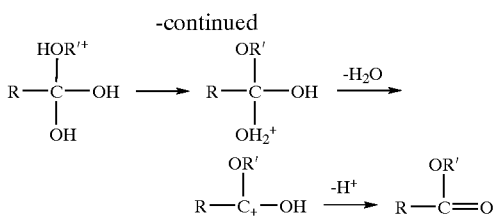

Ester interchange reaction of a variety of fatty acid esters is to be induced in the presence of sodium hydroxide (NaOH) in solvent. The formation of metal alkoxy is explained as follows:

Formula (3)

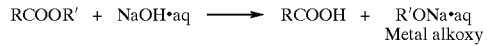

(where R is aliphatic hydrocarbon group having C or longer carbon chain, R'; represents glyceride.)

Explanations for another fatty acid ester are set forth hereinafter:

(Claisen Condensation)

Formula (4)

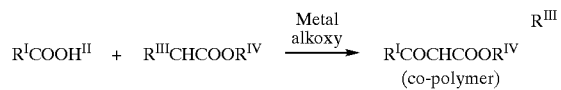

(When the fatty acid of the acid of $C_{10}$ chain hydrocarbon and another ester is glycerin)

The formula (3) and (4) as mentioned above represent the condensation (co-polymerization) of fatty acid ester compounds for solidification in the presence of fatty acid esters and metal alkoxy contained in a state of molecular colloid. The fatty acid ester component contained in colloid is purposefully solidified through co-polymerization to be liberated (polymerized) from the surface of soil particles.

Humin and humic acid is a compound body consisting of various fatty acids, acyl carrier protein (ACP) and peptides. The compound body exists as a gel in water solution. ACP (enzymes purified by *E. coli*, animals and plants) that hold the fatty acid group forms ester bonds with peptide (amino acid residue). The purpose of Formulae (2A) and (2B) is to promote cutting of bonds (hydrolysis) as follows:

A. cutting of peptide linkages at peptide bond —CO—NH—

B. cutting of amino acid residue group bonded with ACP having fatty acid groups through ester bonding via hydrolysis with NaOH.

(Effect III)

As shown in formula (1), nitrite ion (O—N—O⁻) will become a nitro ligand to form coordination compounds with metals (Hg, Cu, Co) having various coordination formula.

Secondarily, (Solute 2) solution and (Solute 3) solution are mixed in order at 1 mol concentration, respectively and the volume for mixing is equal to that of (Solute 1) solution.

(Effect IV)

Two effects are intended from the use of Solute 1, Solute 2 and Solute 3 solutions. They are A Effect (the decomposition of humin) and B Effect (detoxification, stabilization and solidification)

IV—A Effect: The solutes to be used are (Solute 1) and (Solute 2) solutions.

IV—B Effect: The solutes to be used are (Solute 1), (Solute 2), and (Solute 3) solutions.

A Effect

One of the effects is the separation/liberation of organic phosphate esters to which various sugars contained in the state of molecular colloid combine with phosphate ester.

B Effect

This effect is stabilization and solidification of semi-metal (As, Sb) oxides and heavy metal compounds as well as halogenated compounds. That is, the stabilization and solidification of $Cr^{VI}$ (hexa-valent chromium) through reduction; the stabilization and solidification of various halogenated compounds; and the stabilization and solidification of the already-ionized heavy metals and heavy metal ions to be generated in reaction process. (IV-A Effect) The decomposition of humin in the preliminary treatment is explained hereafter.

The chemical formula reaction formula below is for the salvation of (Solute 2) made as a solvent:

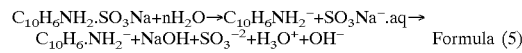

Formula (5)

To explain from the combined product resulted from sugar contained in a state molecular colloid and phosphoric acid ester, (hexose=phosphoric acid), from the formula (5);

Formula (6)

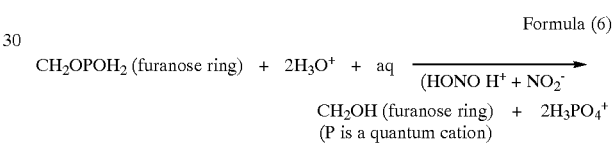

The sugar component will be dissociated and solubilized through $S_{N1}$ substitution reaction (redox reaction; the position of dissociation is the hydrogen atom of $CH_2OH$). Orthophosphoric acid ($H_3PO_4$) formed as shown in the formula (6) will generate various phosphates (solubilization and condensation).

Formula (6) is valid for the existence of NO and $NO_2$ ions that exist through ion balance (equilibrium) in an aqueous solution of a specific solute (sodium nitrite).

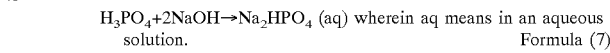

Sodium hydrogen phosphate ($Na_2HPO_4$) will not crystallize but will react with metal salt in an aqueous solution to precipitate.

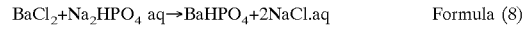

Formula (8)

As a conclusion, the group of soil particles and the groups of organic polymer molecules adhering to it form an outer complex. In other words, the surface of the group of soil particles and the groups of polymer molecules are in a unified state through van der Waals forces, electrostatic interaction and the like.

The separation, condensation and salvation (a decrease in viscosity) between the group of soil particles and the groups of organic polymer molecules (humin) is caused by the interaction through van der Waals forces, hydrophobic interaction, electrostatic interaction and the like. Basically, the format of reaction is dissociation and polymerization through hydration mainly by SN type reaction. (Fatty acid esters will be released from soil particles)

As noted hereinabove, the isolation and decomposition of humin, which is one of the inhibitory factors of combination of soil particles, is completed by addition of (Solute 1) and (Solute 2) and the stirring process. In other words, the preliminary treatment is completed.

After completion of stirring and while the separation of solid and liquid phases is in progress (about 40 to 45 minutes after sitting), the portion of liquid phase is removed.

(IV-B Effect) The following are the technical explanations for the detoxification, stabilization, and solidification of heavy metal compounds, semi-metal compounds, and halogenated compounds in the preliminary treatment.

State of the detoxification and stabilization of hazardous substances: According to HSAB theory, the detoxification and stabilization of heavy metal compounds, semi-metal compounds, and halogenated compounds can be accomplished by the formation of complex compounds between acid and base. In order to achieve the purpose, 1 mol solutions of Solute 1, Solute 2 and Solute 3 are used. As shown in Formula (1), the sodium ion ($Na^+$) and nitrous ion generated in the Solute 1 solution will react with halogenated substances bound with other metal ions to form a stable complex form of halogenated sodium compound through substitution. (Na: hard acid)

In addition, to speak with arsine (As) as semi-metal. As is hard acid and forms nitro complex in the presence of nitrous ion.

Nitro-N complex and nitro-O complex are known as nitro complex. Further, hazardous metal ions (including $Hg^+$, $Hg^{+2}$, $Cd^{+2}$, $Co^{+2}$, $Sn^{+2}$, $Zn^{+2}$, $Bi^{+3}$ existing as soft acid according to theory will be solidified in a form of hygroscopic crystal and tend to be polarized (see the reference formula) to form a recombinant through recombination at the next step.

Reference formula: 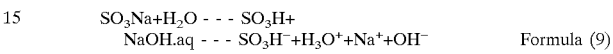

The preliminary treatment is completely finished at this point.

III. Recombination of Soil

The recombination of soil is explained here as the combination between soil particles along with recombination of hazardous substances (as listed below) from the standpoint of inner and outer-sphere mechanisms and ligand substitution.

After completion of the preliminary treatment (IV-A Effect) the 1 mol solution of Solute 1, Solute 2, and Solute 3 is newly added, respectively in order, followed by stirring. State of the Recombination of the Groups of Soil Particles (1) As publicly known, the component of soil particles primarily existing in nature is silicate. (General formula: the compound expressed as xM also M"O and M exist; salts made of M Fe", Ca, Mg, Na, K, etc. are more abundant). It implies such soil particles are major component of earth crust and mantle of the earth as the rock forming minerals.

The groups of such soil particles and crystals are subject to weathering and metamorphosis to turn into finer particles, existing as the clusters. Clay also exists as the clusters. Moreover, when classifying them by the constituents (crystal structure) of clay minerals, there are: Crystalline minerals (Kaolinite; $Al_2Si_2O_5(OH)_4$: Montmorillonite; $M'Si_4(MgAl)O_{10}(OH)_2.nH_2O$; Illite; $K(AlSi_3)Al_2O_{10}(OH)_2$: Chlorite; $(MgAl)(AlSi_3)O_{10}(OH)_8$: and non-crystalline minerals (Allophane; $1\sim2SiO_3.Al_2O_3.H_2O$).

In addition, these crystalline bodies can be classified by the structure (form of grain) into planar, tubular (hollowed tube), (hollowed) fiber, globular, and others. In other words, they are metal complex compounds.

The recombination of soil particles (being as complex compounds) is described from the standpoints of inner-sphere complex (contact ion pairs), inner-sphere mechanism (ligand-bridged reaction), and outer-sphere mechanism including stabilized complex through substitution of heavy metal, semi-metal, and halogenated compounds.

(2) By dissolving Solute 2 and Solute 3 into an aqueous solution, there are electron donor (donating electron) substituents (including —OH, —NH naphthyl —$C_{10}H_8$— and electron recipient (receiving electron) substituents (including —$NO_2$, —$SO^3H$) in the resulted solution. In addition, along with the hydrolysis of sodium sulphonate, $H_3O^+$, $Na^+$ ions are formed.

$SO_3Na+H_2O$ - - - $SO_3H+$
$NaOH.aq$ - - - $SO_3H^-+H_3O^++Na^++OH^-$   Formula (9)

(3) Soil particles from the standpoint of inner-sphere mechanism, clay minerals (soil particles with the presence of hydroxyl group) are classified as follows:

(A) type I—Kaolinite $Al_2Si_2O_5(OH)_5$, halloycite $Al_2Si_2O_5(OH)_4.2H_2O$, and serpentine $(Mg, Fe^{+2})_3Si_2O_5(OH)_4$:

Smectite—Montmorillonite $MO_{0.33}Si_4(Mg_{0.33}Al_{1.67})O_{10}(OH)_2.nH_2O$

Mica—Illite $K(AlSi_3)Al_2O_{10}(OH)_2$:

1:1 Chlorite $(Mg_5Al)(Al_2Si_3)O_{10}(OH)_8$:

(B) Soil particles existing as Werner type complex are Buddingtonite $NH4[AlSi_3O_8].1/2H_2O$ Zeolite $M_{2/n}O.Al_2O_3.xSi_2.yH_2O$ (where M=Na, K, Ca, Ba. n is valence, x~2~10, and y=2~7

Antonio complex biogenic rock: limestone $NaO.CaO.Al_2O_3.CaCO$ (4) To explain the properties of the group (A), hydrogen atoms of the hydroxyl group that are added to Si existing in the structure formula can react with metal ions through substitution. As a result, for instance, the formation is as follows:

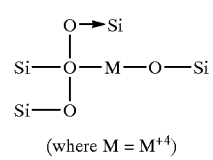

Formula (9A)

(where M = $M^{+4}$)

That is, silica (Si) ion can form a rock structure by incorporating M metal in its center.

Formula (10)

(Where R is alkyl group or allyl group, M is monovalent metal; M is monovalent or polyvalent metal, Rn.M)

In addition to the above, there are metal ions generated by polarization as stated in (1) as bridged compound adsorbed by hydroxyl group. There ions are adsorbed onto —Si—$(OH)_n$ through $S_N$ reaction, then stabilized and solidified. Moreover, hydrogen atom in the silicon-hydroxyl group becomes a rock-forming factor (n=1~3)

Addressing the properties of group (B), buddingtonite in the presence of the electron donor group ($NH_2$, naphthyl group) in the aqueous solution of Solute 2 and Solute 3, it will be modified into other complex through substitution caused by interchange mechanism of metal complex ligand substitution.

$$NH[AlSi_3O_8]1/2H_2O+ \\ C_{10}H_8^- + e^- \rightarrow NH_4^+ + [AlSi_3O_8].1/2H_2O \quad \text{Formula (11)}$$

$$[AlSi_3O_8]^- + Na^+.aq \rightarrow Na[AlSi_3O_8] \quad \text{Formula (12)}$$

Also, using zeolite as an example, $$K_2O.Al_2O_3.xSiO_2.yH_2O+ \\ 2e^- \, aq \rightarrow 2K^+ + [Al_2O_3.xSiO_2]_2.yH_2O.aq \quad \text{Formula (13)}$$

On the other hand, the hazardous metal complex ($Cd^{+2}$, $Pb^{+2}$, $Co^{+2}$) which is sulfonated and formed in (1) will be again ionized to become metal ions through electron transfer complex in the solution of Solute 2 and Solute 3. Namely, they are solidified and the process can be expressed as follows in relation to (12).

$$[Al_2O_3.xSiO_2]^{-2}.yH_2O+ \\ Cd^{+2} \rightarrow CdO.Al_2O_3.xSiO_2.yH_2O+aq \quad \text{Formula (14)}$$

Also, the existence of nitrous ion generated in the solution of Solute 1 and naphthol ($C_{10}H_8O^-$) will promote the liberation of halogen ions and hydrocarbon group.

(5) After the above noted stirring process, (sitting for 15 minutes) Solute 4, sodium silicate exists as ortho-type ($Na_4SiO_4$, $Na_2Si_2O_5$, $Na_2Si_2O_5$) and meta-type and is prepared in a 0.5 mol solution, respectively by adding 5% volume by solid volume, then stirring.

The purpose of using Solute 4 is to stabilize active species existing in super fine soil particles in the form of carbonyl cluster ($Fe_8(CO)_{12}$) and sulfonic ion ($H_2SO_3^-$ aq) generated in an aqueous solution of Solute 2 and Solute 3.

(6) Through the previous step, the recombination of soil particles is completed; however, the diameter of soil particles considered in the present invention is around 1000 μm, or within the range that is potentially effective for surface adsorption effect. As shown in formula (10), groups of soil particles recombine to form clusters by substituting hydrogen ion existing in hydroxyl group for other metal ion or sodium ion formed in Solute 4. In other words, the recombination of soil particles starts with the particles having a diameter of 2 μm or below and grows up to become clusters having a diameter ranging from 1000 to 2000 μm.

(7) As known, a porous substance is made by mixing single substance of silica gel ($SiO_2.nH_2O$) and another specified substance to bake as a ceramic. As noted above, based on inner and outer sphere mechanisms and ligand field theory, the stabilization and solidification of general soil (including polluted soil) is thus provided.

The Status of the Recombination of hazardous Metals (1) The coordination compounds of hazardous substances through the formation of ligand bridges according to HSAE theory are polarized in the presence of electron transfer molecules as stated in paragraph (1) hereinabove, and furthermore, they will become one of the components of the subject substance (recombinants) to form it electron recombinants. (The above is explained in the status o the stabilization of hazardous metals in B Effect of Effect IV in [II].) The treated soil through the process of recombination between soil particles and hazardous substances will become solidified soil that will no longer elute hazardous substances.

IV. The Method for Manufacturing Soil Having Properties

The additives to be used are (Additive 5), (Additive 6), and (Additive 7) set forth in Table I. The method for manufacturing soil having properties stated below (permeability, non-dissipation, heat resistance, acid resistance, saltwater resistance, etc.) uses the additives specified in the present invention to modify soil quality into a unique one.

However, prior to the use of the specified additives, after the preliminary treatment of humin and hazardous metals in soil as mentioned above to made hazardous metals as part of components, the recombination of soil will be in process. At this point, the targeted additive is added to modify the soil quality. Additives for:

Permeability: (for road surface)—calcium oxide, calcium hydroxide; Non-permeability: (for river banks)—metamorphic rock (powdered sand rock) powdered mica family rock;

Heat resistance: (for heat resistant incinerators)—graphite; Saltwater resistance: (for fish bed)—calcium oxide, calcium hydroxide;

Anti-resilience: (for foundation and base materials of road shoulder)—metamorphic rock (powdered);

Durability: (for enhanced strength of road shoulder)—powdered mica family rock.

Based on the method mentioned above when improving soil quality and returning to the original place. By removing the improved soil to another place to use another purpose, it can be done by heating it up around 300 upon adding the specified additive/s to make ceramic. Applications are wide and diverse.

V. Summary of Process

The above reactions are conducted continuously (i.e. take place simultaneously) and various solutes added in sequence, a series of reactions thus occurring rapidly. An example of such a reaction follows:

(a) When putting in solutes 1 and 2 (see Table 1), humin ($R.CH_2O.P_2O_5$) is separated from soil particles. The recombination between separated soil particles is promoted and the isolated humin and the combined soil particles repel each other. In other words, the repelling force is acting between humin and soil particles.

(b) When putting in ortho-type sodium silicate, hydrolysis subsequently takes place, resulting in hydroxyl silicic acid and sodium ion. Hydrogen originated from hydroxyl silicic acid combines with metal in soil particles and the isolated sodium ion combines with phosphoric acid.

(c) In the next step, an additive such as graphite or calcium oxide, is added. In the mixture, heavy metal or semi-metal compounds contained in soil particles as separated from humin are eluted out as heavy metal or semi-metal ions. In order to solidify such heavy metal or semi-metal ions, graphite or calcium oxide is used. As a result, a metal ion or ions is or are incorporated into a heterogeneous structure for stabilization purposes. When graphite is added, sodium oxide is adsorbed onto an electron layer (of graphite) to form a layered compound (semi-metal compounds will be adsorbed onto the layer of p-hole). When calcium oxide is added, (1) calcium ions will be adsorbed onto vacuo (gap) in soil particles resulting from the elution of heavy metal or semi-metal ions. (2) Also, for instance, $Ca(OH)_2 + Cd^{+2} \rightarrow Cd(OH)_2 - Ca^{-2}$ [M=Cd]. Then, $Ca^{-2}$ will enter into vacuo and $Cd(OH)_2 + SiO_2 \rightarrow SiOCdSiO \rightarrow Cd(SiO)_2$ Subsequently, it will become a heterogeneous structure and stabilized.

(d) Thereafter, ortho-type sodium silicate will be substituted with two hydrogen ions of hydroxyl silicic acid that results from hydrolysis and finally monovalent and divalent metal ions will be attracted to the hydrogen ions on the hydroxyl groups. This incorporates the metal ions into the silicate structure which promotes forming of rocks with smaller and larger grains of soil.

The above process is conducted continuously at the same time. The product will then be dried under sunlight and solidified to form a strong solid substance as the water content is evaporated.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teachings of the invention without departing from its essential teachings it is therefore intended by the appended claims to cover any and all such applications, modifications and embodiments within the scope of the present invention.

What is claimed is:

1. A method of recombining soil comprising the steps of:
 a. mixing said soil with an aqueous solution of sodium nitrate in order to form a first mixture whereby an amino acid is decomposed, a fatty acid is esterified, and a coordination compound is formed with a hazardous heavy metal;
 b. stirring into said first mixture an aqueous solution of sodium 1-naphthylamine-4-sulfonate in order to form a second mixture whereby the humin contained in said soil is decomposed;
 c. allowing said second mixture to settle until the solid and liquid phases separate;
 d. decanting said liquid phase;
 e. stirring into the remaining solid phase an aqueous solution of a compound selected from the group consisting of 1-napahthol-4-sulfonic acid and 2-naphthol-4-sulfonic acid in order to form a third mixture whereby a hazardous semi-metal and said hazardous heavy metal are reduced and precipitated as salts and a hazardous halogenated compound is complexed with sodium;
 f. allowing said third mixture to settle; and
 g. stirring into said settled third mixture an aqueous solution of sodium silicate to cause growth of soil particles.

2. The method of claim 1 in which said sodium nitrate solution has a concentration of 1 mol, said sodium 1-naphthylamine-4-sulfonate solution has a concentration of 1 mol, said 1-naphthol-4-sulfonic acid solution has a concentration of 1 mol, said 2-naphthol-4-sulfonic acid solution has a concentration of 1 mol, said sodium silicate solution has a concentration of 0.5 mol, said sodium nitrate solution is mixed with said soil in a concentration of 30% by volume, said sodium 1-naphthylamine-4-sulfonate solution is mixed with said first mixture in a concentration of 30% by volume, said 1-haphthol-4-sulfonic acid solution is mixed with solid phase a concentration of 30% by volume, said 2-naphthol-4-sulfonic acid solution is mixed with said phase in a concentration of 30% by volume, and said sodium silicate solution is mixed with said settled third mixture in a concentration of 30% by volume.

3. The method of claim 1 in which the sodium silicate causes growth of said soil particles from 2 $\mu$m to 1000 to 2000 $\mu$m.

4. The method of claim 1 further comprising the steps of:
 a. adding powdered metamorphic rock;
 b. stirring; and
 c. allowing moisture to evaporate.

5. The method of claim 1 further comprising the steps of:
 a. adding powdered mica;
 b. stirring; and
 c. allowing moisture to evaporate.

6. The method of claim 1 further comprising the steps of:
 a. adding powdered metamorphic rock;
 b. adding powdered mica;
 c. stirring; and
 d. allowing moisture to evaporate.

7. The method of claim 1 further comprising the steps of:
 a. adding graphite;
 b. stirring; and
 c. allowing moisture to evaporate.

8. A method of recombining soil comprising the steps of:
 a. decomposing an amino acid, esterifying a fatty acid, and forming a coordination compound with a hazardous heavy metal contained in said soil;
 b. decomposing humin contained in said soil;
 c. reducing a hazardous semi-metal contained in said soil and said hazardous heavy metal, precipitating said reduced hazardous semi-metal and said hazardous heavy metal as salts, and complexing a hazardous halogenated compound contained in said soil with sodium; and
 d. causing growth of soil particles in said soil.

9. The method of claim 8 in which the soil particles grow from 2 $\mu$m to 1000 to 2000 $\mu$m.

10. The method of claim 8 further comprising the steps of making said soil permeable.

11. The method of claim 8 further comprising the steps of making said soil non-premeable.

12. The method of claim 8 further comprising the steps of making said soil heat resistant.

13. The method of claim 8 further comprising the steps of making said soil salt water resistant.

14. The method of claim 8 further comprising the steps of making said soil non-resilient.

15. The method of claim 8 further comprising the steps of making said soil durable.

* * * * *